(12) United States Patent
Petrenko (10) Patent No.: US 7,159,323 B2
(45) Date of Patent: Jan. 9, 2007

(54) CIRCULAR SAW FOR FACILITATING STRAIGHT CUTS AND/OR CUTS AT A DESIRED ANGLE RELATIVE TO A WORKPIECE EDGE

(76) Inventor: Alex Petrenko, 100 McCabe St., Charlotte, FL (US) 33953

( * ) Notice: Subject to any disclaimer, the term of this patent is extended or adjusted under 35 U.S.C. 154(b) by 37 days.

(21) Appl. No.: 10/889,208

(22) Filed: Jul. 12, 2004

(65) Prior Publication Data

US 2005/0160607 A1    Jul. 28, 2005

Related U.S. Application Data

(60) Provisional application No. 60/538,572, filed on Jan. 23, 2004.

(51) Int. Cl.
B27B 9/04 (2006.01)
(52) U.S. Cl. .............. 30/373; 30/374; 30/371
(58) Field of Classification Search ............ 30/371, 30/373, 374, 375, 376; 83/485, 486, 486.1, 83/468.7
See application file for complete search history.

(56) References Cited

U.S. PATENT DOCUMENTS

| | | | |
|---|---|---|---|
| 1,753,959 A * | 4/1930 | Wikstrom | 30/374 |
| 3,481,374 A * | 12/1969 | Schindler | 30/373 |
| 3,839,789 A * | 10/1974 | Valkosky | 30/374 |
| 3,903,774 A * | 9/1975 | Stinson | 83/471.2 |
| 4,033,035 A | 7/1977 | Trimmer | |
| 4,079,648 A | 3/1978 | Chappell | |
| 4,087,914 A * | 5/1978 | Bates | 30/374 |
| 4,181,057 A | 1/1980 | Bassett | |
| 4,328,728 A | 5/1982 | Ferdinand et al. | |
| 4,736,523 A | 4/1988 | Hanning | |
| 4,777,726 A | 10/1988 | Flowers | |
| 4,784,029 A | 11/1988 | Gebelius | |
| 4,790,072 A * | 12/1988 | Edwards | 30/376 |
| 5,121,554 A | 6/1992 | Havins | |
| 5,566,456 A | 10/1996 | Sawyer, Jr. | |
| 5,577,428 A | 11/1996 | Rueb | |
| 6,055,734 A | 5/2000 | McCurry et al. | |
| 6,173,631 B1 | 1/2001 | Schock | |
| D449,503 S | 10/2001 | Tsuzuki et al. | |
| 6,412,179 B1 | 7/2002 | Ende | |
| 6,438,851 B1 | 8/2002 | Laltoo | |
| 6,568,088 B1 | 5/2003 | Ende | |
| 6,591,509 B1 | 7/2003 | LeBlanc | |
| 2001/0037578 A1 | 11/2001 | Mori et al. | |
| 2002/0144405 A1 | 10/2002 | Moore et al. | |
| 2002/0189109 A1 | 12/2002 | Laltoo | |
| 2003/0047050 A1 | 3/2003 | Onose et al. | |

(Continued)

Primary Examiner—Hwei-Siu Payer
(74) Attorney, Agent, or Firm—RatnerPrestia (57) ABSTRACT

A power saw having one or more features for facilitating straight line and/or angled cuts, including (1) at least two sets of non-slip wheels connected to the bottom plate, each set of wheels comprising an axle having at least two wheels that are fixed to rotate at the same rate as the axle, (2) a transparent guide attached to and extending from the front of the bottom plate comprising a straight line marking aligned with the saw blade for alignment with a marking on the workpiece, and (3) a sliding guide adapted to travel within a slot in the bottom plate, the sliding guide adjustable to a desired angle relative to the saw blade and attached to a mechanism that provides resistance to rearward movement of the sliding guide and retracts the sliding guide back to a starting position after completion of a cut.

24 Claims, 8 Drawing Sheets

U.S. PATENT DOCUMENTS

2003/0084771 A1  5/2003  Taormina et al.

2003/0131484 A1  7/2003  Yoshida et al.

* cited by examiner

CIRCULAR SAW FOR FACILITATING STRAIGHT CUTS AND/OR CUTS AT A DESIRED ANGLE RELATIVE TO A WORKPIECE EDGE

CROSS-REFERENCE

This invention claims priority of U.S. provisional patent application Ser. No. 60/538,572, filed Jan. 23, 2004, the contents of which are incorporated herein by reference.

FIELD OF THE INVENTION

This invention relates to saws, and more particularly for improvements to circular saws for facilitating straight cuts and/or cuts at a desired angle relative to an edge of the workpiece.

BACKGROUND OF THE INVENTION

Circular saws are well known in the art and are often used to cut a straight line over a substantial distance, for example on a sheet of plywood. Circular saws are also often needed to make cuts that are angled relative to the workpiece edge. Although miter saws are known for making angled cuts on short workpieces, such as 2×4s, they are not useful for angled cuts that must extend for a substantial distance, such as on a plywood sheet. In such circumstances, typically a line is drawn on the workpiece, such as with a ruler or chalk line, and the user follows that line with the saw on the workpiece. Often, however, the user may stray from that line, making a cut that is not as straight as may be desired.

It would be advantageous, therefore, to provide a saw that facilitates cutting over long distances in a straight line, whether following a drawn line, or whether making the step of drawing such a line optional. It would also be desirable to provide a saw that facilitates making an angled cut relative to the edge of the workpiece that can be used for making longer cuts than are capable with a miter saw.

SUMMARY OF THE INVENTION

The invention generally comprises a power saw, such as a circular saw, having features for facilitating straight line cuts and/or angled cuts. In each embodiment, the saw comprises a body, a blade, and a bottom plate, the bottom plate having a bottom side for contacting a surface of the workpiece, a top side facing the body, a front, and a rear.

One set of features for facilitating straight line cuts includes the bottom plate comprising at least two sets of wheels connected to the bottom plate, each set of wheels comprising an axle having at least two wheels fixed to the axle in a configuration that prevents rotation of the wheels relative to the axle. The bottom plate has an opening aligned with each wheel to allow the wheel to protrude through the opening. Each wheel comprises a non-slip feature, such as plurality of protrusions capable of biting into the workpiece, for minimizing slippage of the wheel on the workpiece. The sets of wheels may have a lowered configuration relative to the bottom plate in which the wheels protrude through the openings past the bottom surface of the bottom plate a sufficient distance to contact the workpiece, and a raised configuration relative to the bottom plate in which the wheels do not protrude through the openings past the bottom surface of the bottom plate. A toggle mechanism may be provided for raising and lowering the wheels.

In one embodiment, the toggle mechanism comprises each axle attached to one or more bearing arms of a wheel carriage body, each wheel carriage body pivotally attached to the bottom plate. A motion transferring crank is mounted to one end of each axle and has a pin that is slidable within a slot of a corresponding carriage bracket mounted to a synchronizing bar slidably attached to the bottom plate. The motion transferring crank is adapted to transfer forward or backward motion of the carriage bracket to upward or downward pivoting of the axle and associated wheel carriage body. A toggle lever attached to a linkage is adapted to move the synchronizing bar backward or forward relative to the bottom plate dependent upon movement of the toggle lever, thereby simultaneously moving all of the carriage brackets attached to the synchronizing bar.

Another set of features for facilitating straight line cuts comprises a transparent guide attached to and extending from the front of the bottom plate, the transparent guide comprising a straight line marking aligned with the saw blade for alignment with a marking on the workpiece. The transparent guide may have an upturned leading edge and may be pivotably attached to the front edge of the bottom plate to allow the guide to be pivoted into a down position to make contact with the workplace and pivoted into an up position when not being used.

A set of features for facilitating cuts at an angle to an edge of a workpiece comprising the bottom plate comprising a sliding guide adapted to travel within a slot in the bottom plate, the sliding guide having a bottom portion mounted on the bottom side of the bottom plate and a top portion mounted on the top side of the bottom plate. The bottom portion comprises an engagement surface for engaging an edge of the workpiece, the engagement surface adjustable to desired angle relative to the saw blade. A resistance mechanism has a first end attached to the bottom plate at or near the front of the top side of the bottom plate and a second end attached to the sliding guide. The resistance mechanism is adapted to provide resistance to motion of the sliding guide in the direction of the rear of the bottom plate and to retract the sliding guide back to a starting position after completion of a cut. A storage unit extends upward and away from the rear of the bottom plate. The storage unit has a slot aligned with the slot in the bottom plate and is adapted to receive and store the sliding guide in a position in which the sliding guide does not engage the workpiece. In one embodiment, the storage unit comprises a stop adapted to hold the sliding guide in place on the storage unit, the stop adapted to be manipulated to allow retraction of the sliding guide to the start position.

Each of the sets of features described above may be provided alone or in combination with any or all of the other features.

DETAILED DESCRIPTION OF THE INVENTION

Referring now to the figures, a first embodiment for facilitating straight cuts is shown in FIGS. 1–3B. FIGS. 4 and 5 illustrate another embodiment for facilitating straight lines. FIGS. 6–13 illustrate several embodiments of that are particularly useful for making cuts that are at desired angles to the edge of a starting surface. FIGS. 15–18 illustrate an embodiment combining the features shown separately in FIGS. 1–3B and 12–14. It should be understood that the features shown and discussed with respect to each embodiment may be combined with some or all of the features of the other embodiments.

Figure 6:
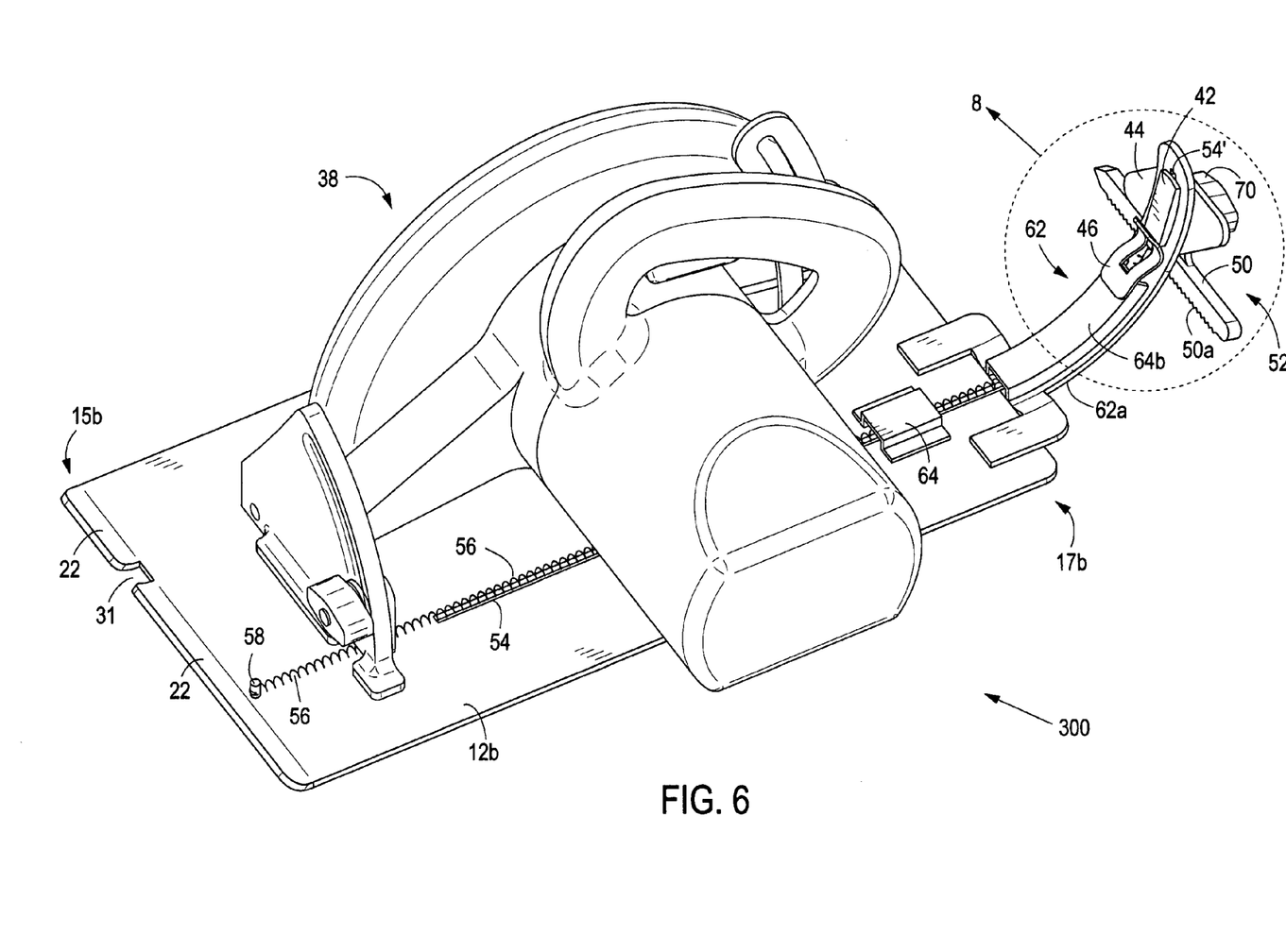
FIG. 6 is a perspective top view of a circular saw having an exemplary bottom-mounted guide, shown mounted in a storage position.

As shown in FIGS. 4 and 6, power saws, such as circular saws, have a body 38, a saw blade 34, and a bottom plate 12a or 12b. The body typically includes a motor 35 that moves the blade, a handle 37 for picking up and directing the saw, and other features that are not described in detail here. The saw body may have any features or attributes known in the art or otherwise desired, however, as the invention is not limited to any particular body type or style.

FIGS. 1–3B generally show an embodiment in which at least two, preferably three sets of wheels are mounted on the bottom plate of the saw so that non-slip features, preferably spikes in the wheels, protrude through the bottom plate for grabbing the surface being cut. Each set of at least two wheels comprises wheels that are fixed to a common axle that locks all the wheels in the set to the same rate of revolution. This assures that the path of the saw remains straight once started. A toggle mechanism allows sets of wheels to be raised or lowered relative to the plate so that they can be raised when the user does not want the wheels to make contact with the work surface for a particular cut.

FIGS. 4 and 5 generally show an embodiment featuring a transparent guide having a marked line aligned with the blade of the saw and that can be flipped down onto the cutting surface to ride ahead of the saw for use in aligning the saw with a marked line on the surface of the object being cut. The forward edge of the guide has an upturned edge to prevent that edge from grabbing the cutting surface.

FIGS. 6–13 generally show embodiments for making straight cuts that are angled to an edge of a subject to be cut, comprising an adjustable guide for mounting underneath the bottom plate and having an adjustable angle between an angle perpendicular to the plane of the saw blade to an angle at least 45-degrees relative to the plane of the saw blade. The guide is attached to a slide that travels in a groove in the bottom plate. A spring is attached to a fixture on the top of plate at one end and to the top of the slide on the other end. The edge of the work surface is aligned parallel with the guide, and as the saw is moved forward the guide slides backward through the groove. The guide is fully slidable out of the groove into a storage unit positioned behind and above the bottom plate for making cuts without interference from the guide when desired, and for continuing cuts started with the guide but that are longer than the length of the bottom plate.

Non-Slip Wheels

Figure 1:
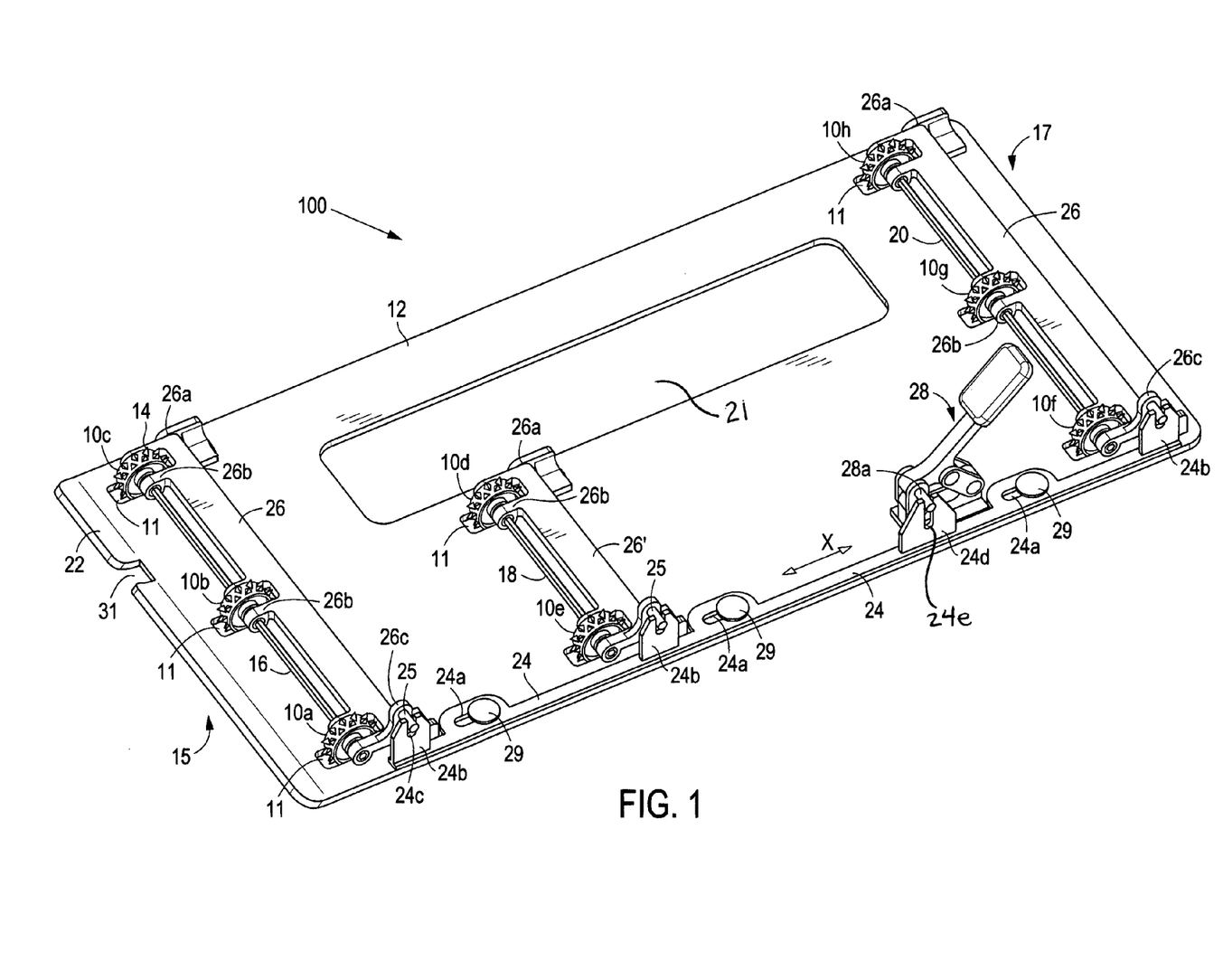
FIG. 1 is a perspective view of an exemplary bottom plate having spiked guide wheels for use with a circular saw of the present invention.

Referring now in more detail to embodiment 100 shown in FIGS. 1–3B, bottom plate 12, illustrated without the saw blade and motor for ease of visualization, has a saw opening 21 through which the saw blade protrudes and a plurality of wheel openings 11 through which at least portions 13 of wheels 10a–h protrude. As shown in FIG. 1, wheels 10a–c are mounted on common axle 16; wheels 10e and 10d are mounted on common axle 18, and wheels 10f–h are mounted on common axle 20. Each axle is mounted through a plurality of bearing arms 26b of an associated wheel carriage body 26 or 26'.

Each wheel 10a–h has a plurality of non-slip features, such as for example, spikes 14. Although shown as wheels having two rows of pyramidal teeth having a right-triangular cross section, the wheels may be of any construction and the non-slip features may have any characteristics known in the art, such as but not limited to a gritty surface or a soft rubbery surface. Protruding spikes are preferred, however, particularly where there is no concern about damaging the surface being cut, because if the spikes are of sufficient sharpness, they stick into the wood and minimize any unwanted side-to-side motion of the saw. In one embodiment, the protrusions may be very thin and knife-like to maximize their ability to stick into the wood.

The axles are preferably non-round in profile so that the wheel may be mounted on the axle in a manner that does not allow relative rotation between the axle and the wheel. In this way, each set of wheels on a common axle is forced to turn at the same rate of revolution, assuring that the wheels guide the saw along a straight path. The wheels may be fixed to the axle using a sleeve bearing 31, as shown in FIG. 3B, having an outer bearing surface 31a with a round cross section and an axle engaging surface 31b with a non-round cross section that matches the cross section of the axle. Although shown as a hexagonal cross section in FIG. 3B, the axle and axle engaging surface may have a cross section that is in the shape of any polygon, an oval, or a circle with portions removed (such as a chord or a groove) or with one or more protrusions. The axle may also be round in cross-section everywhere except for mounting locations for the wheels, where the non-round portion may comprise an attachment or modification of the axle to form the non-round area.

Figure 3A:
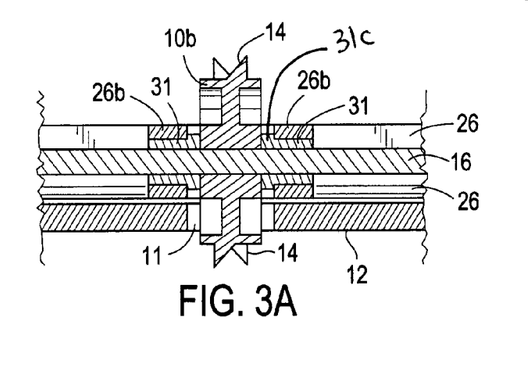
FIG. 3A is a partial cross sectional view of an exemplary wheel 10b of FIG. 1.
Figure 3B:
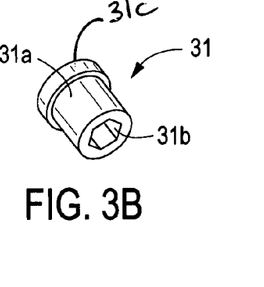
FIG. 3B is a perspective view of an exemplary sleeve bearing element.
Figures 4, 5:
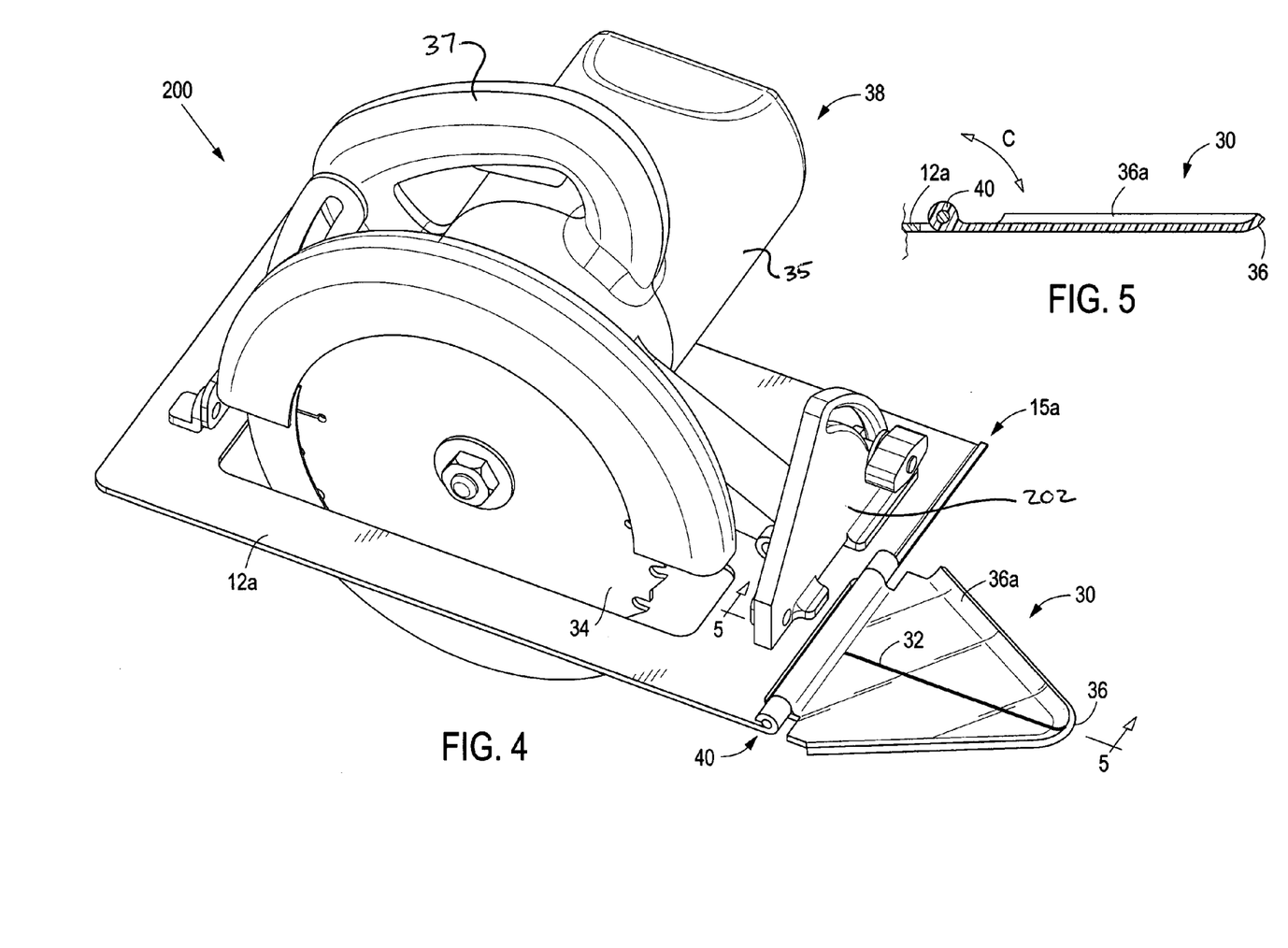
FIG. 4 is a perspective view an a circular saw having an exemplary front-mounted transparent guide.
FIG. 5 is a cross sectional view of the transparent guide of FIG. 4, taken along line 5—5.

One exemplary mounting system is shown in FIG. 3A with respect to center wheel 10b on axle 16. Axle 16 runs through the center of wheel 10b and bearings 31 on opposite sides of the wheel. The bearings are mounted within bearing arms 26b of wheel carriage body 26 such that bearing surface 31a rides within a matching bearing surface of bearing arm 26b. Larger diameter portion 31c of each bearing is positioned between the edge of the bearing arm and the wheel to keep the wheel from moving along the axis of the axle.

Figure 2A:
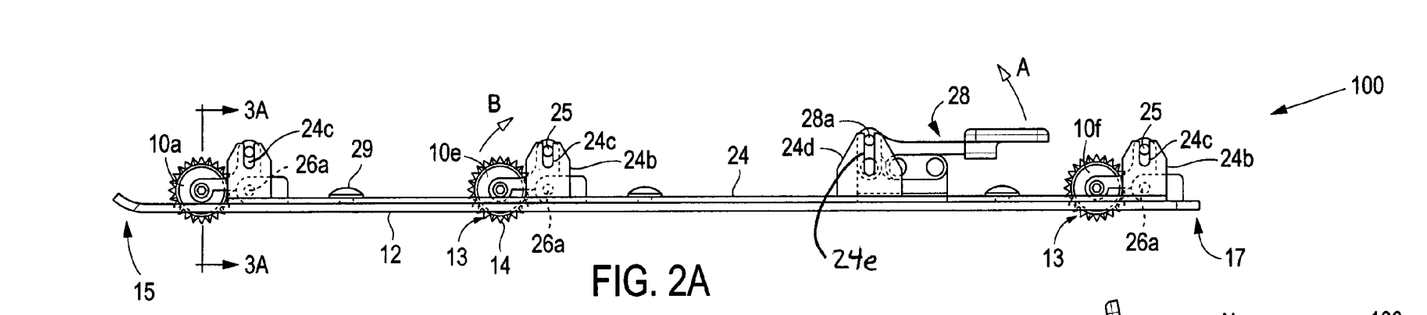
FIG. 2A is a side view of the bottom plate of FIG. 1 with the wheels in the lowered position.
Figure 2B:
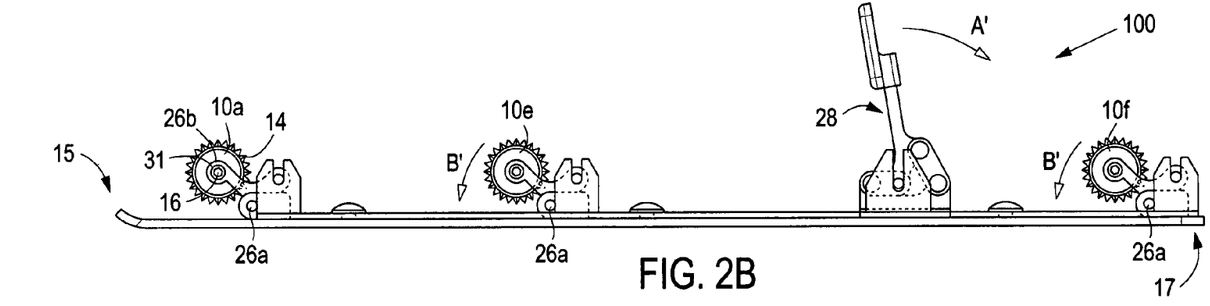
FIG. 2B is a side view of the bottom plate of FIG. 1 with the wheels in the raised position.

Because there may be times when it is not desired to make a straight cut with the saw, the wheels may be raised out of contact with the work surface or lowered to make contact with the work surface. One exemplary mechanism for providing such a functionality is illustrated in FIGS. 1, 2A, and 2B. As shown in FIG. 1, each wheel carriage body comprises a pivot bracket 26a on each end that is fixed to bottom plate 12. Motion transferring crank 26c is mounted to the end of each axle 16, 18, 20 and has a pin 25 that is slidable within slot 24c of carriage bracket 24b. Carriage brackets 24b are mounted to synchronizing bar 24 that is slidably attached to bottom plate 12 via pins 29 through longitudinal slots 24a that enable bar 24 to slide back and forth along arrow X. Toggle mechanism 28, shown in a down position in FIG. 2A, is mounted to bottom plate 12 and has a connecting pin 28a that is slidably mounted within slot 24e of toggle bracket 24d. When toggle mechanism 28 is moved from the down position to the up position along arrow A shown in FIG. 2A into the position shown in FIG. 2B, the linkage of that mechanism forces synchronizing bar 24 to move toward back end 17 of bottom plate 12, causing pin 28a to slide downward within slot 24e and pins 25 to slide downward in brackets 24b, thereby lifting the axles relative to the bottom plate and raising the wheels along arrow B. The opposite action of toggle mechanism 28 along arrow A' causes the wheels to be lowered along arrow B'.

Thus, a user may align the saw on a line to be cut, and once the saw is started along a straight line, the spiked wheels 10a–h fixed on axles 16, 18, and 20 keep the saw moving straight. Notch 31 at front 15 of the bottom plate 12 as shown in FIG. 1, or other features described herein later, may be used to align the saw along a line to be cut. Leading edge 22 at front 15 of plate 12 may be upturned to allow for smoother travel over the workpiece. Although shown with three axles, with three wheels on axles 16 and 20, and two wheels on axles 18, the number of axles and wheels per axle may be in any combination as space permits, as long as there are at least two axles, and at least two wheels on each axle. Given the improved ability for the saw to cut in a straight line, it is additionally desirable to assure that the saw is aligned correctly on the line to be cut. Accordingly, the features discussed next are particularly useful when combined with the features described above, although any of the features may also be used alone.

Transparent Front-Mounted Guide

Referring now to FIGS. 4 and 5, transparent front-mounted guide 30 has a marked line 32 aligned with blade 34 of saw embodiment 200. This guide is attached to bottom plate 12a via a hinge 40 on front 15 of the plate 12 that allows the guide to be flipped down onto the cutting surface as shown in FIG. 4 to ride ahead of the saw. Marked line 32 can then be aligned with a marked line on the surface of the object being cut (not shown) so that the user of the saw can be assured of following the desired path. At least leading edge 36 of guide 30, and also optionally side edges 36a, are upturned to prevent the guide from grabbing the cutting surface. The guide pivots within hinge 40 along arrow C to allow the guide to be flipped up out of the way into a storage position (not shown) when its use is not desired.

As shown in FIG. 4, saw 200 has an assembly 202 for facilitating cuts that are angled, rather than normal, relative to the plane of the work surface, as is known in the art. In such an embodiment, assembly 202 acts as a stop to prevent guide 30 from contacting the saw blade 34. The guide is not limited to use on such a saw, however, and may be used with any type of saw known in the art. Accordingly, where there is not already a physical stop of some type to prevent the guide from contacting the saw blade in the storage position where the dimensions of the guide and the plate would otherwise allow such contact, some type of physical stop is preferably provided.

Sliding Guide

Figure 7:
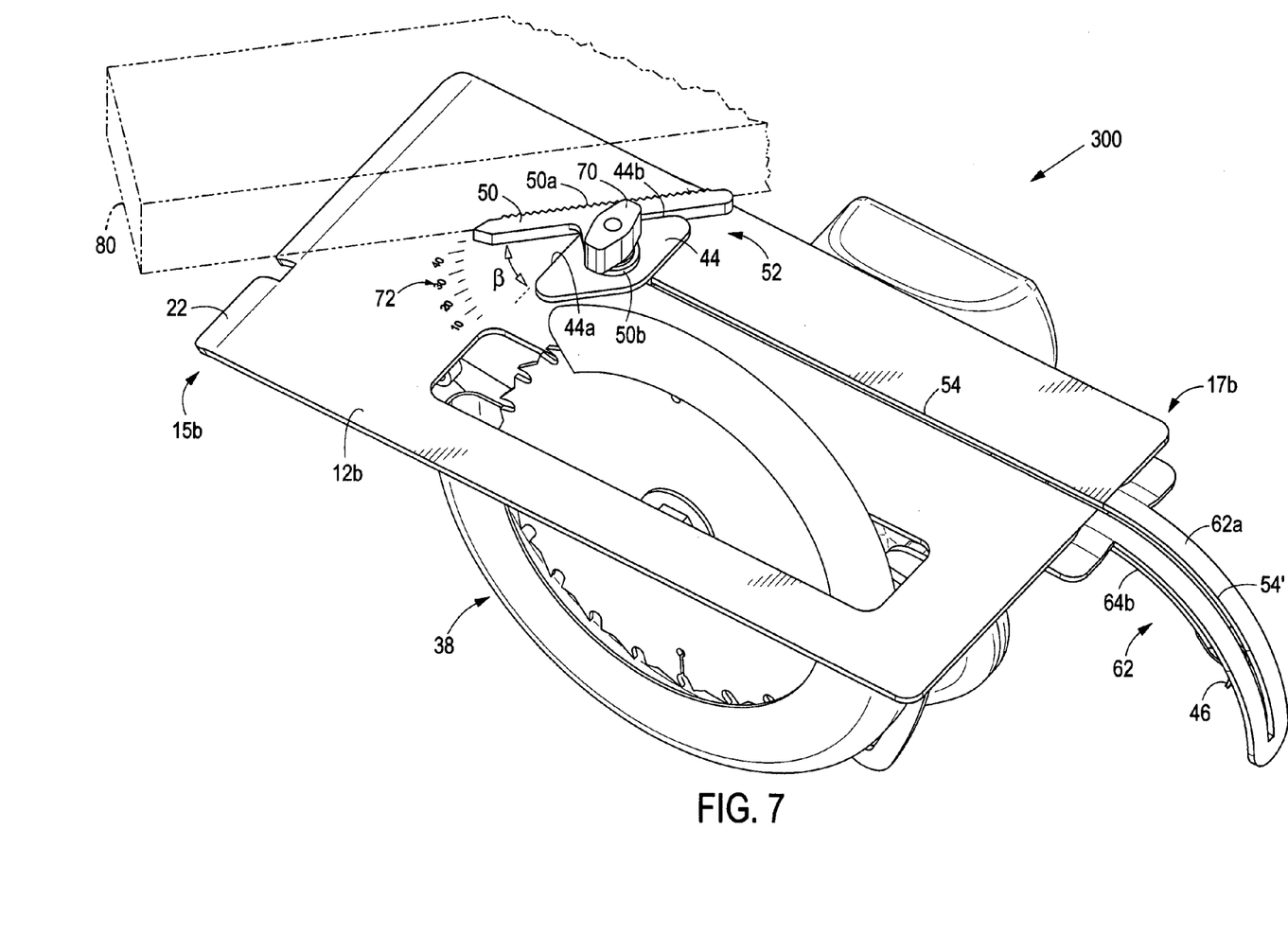
FIG. 7 is a perspective bottom view of the circular saw of FIG. 6, showing the bottom-mounted guide oriented at an angle in a starting position.

Referring now to FIGS. 6–13, FIG. 7 shows a saw embodiment 300 comprising one embodiment of a sliding guide 52 with a rough leading edge 50a for non-slip engagement of a workpiece 80. Guide 52 is pivotable between an angle of 0 and 45 degrees relative to a line perpendicular to the saw blade. As shown in FIG. 7, knob 70 may be loosened to allow guide 52 to pivot, and tightened to frictionally engage tab 50b of the guide once a desired angle has been selected. The underside of bottom plate 12b may be marked with a markings 72 and guide 52 may have a pointed front portion 50 for use with the markings for facilitate angle selection. Cam plate 44 may be provided with a front edge 44a that constrains the guide from pivoting beyond 0 degrees and a side edge 44b that constrains the guide from pivoting beyond 45 degrees. Other embodiments may have no such constraints, however, and/or may have the ability to pivot over a different range.

Figures 8, 9, 10, 11:
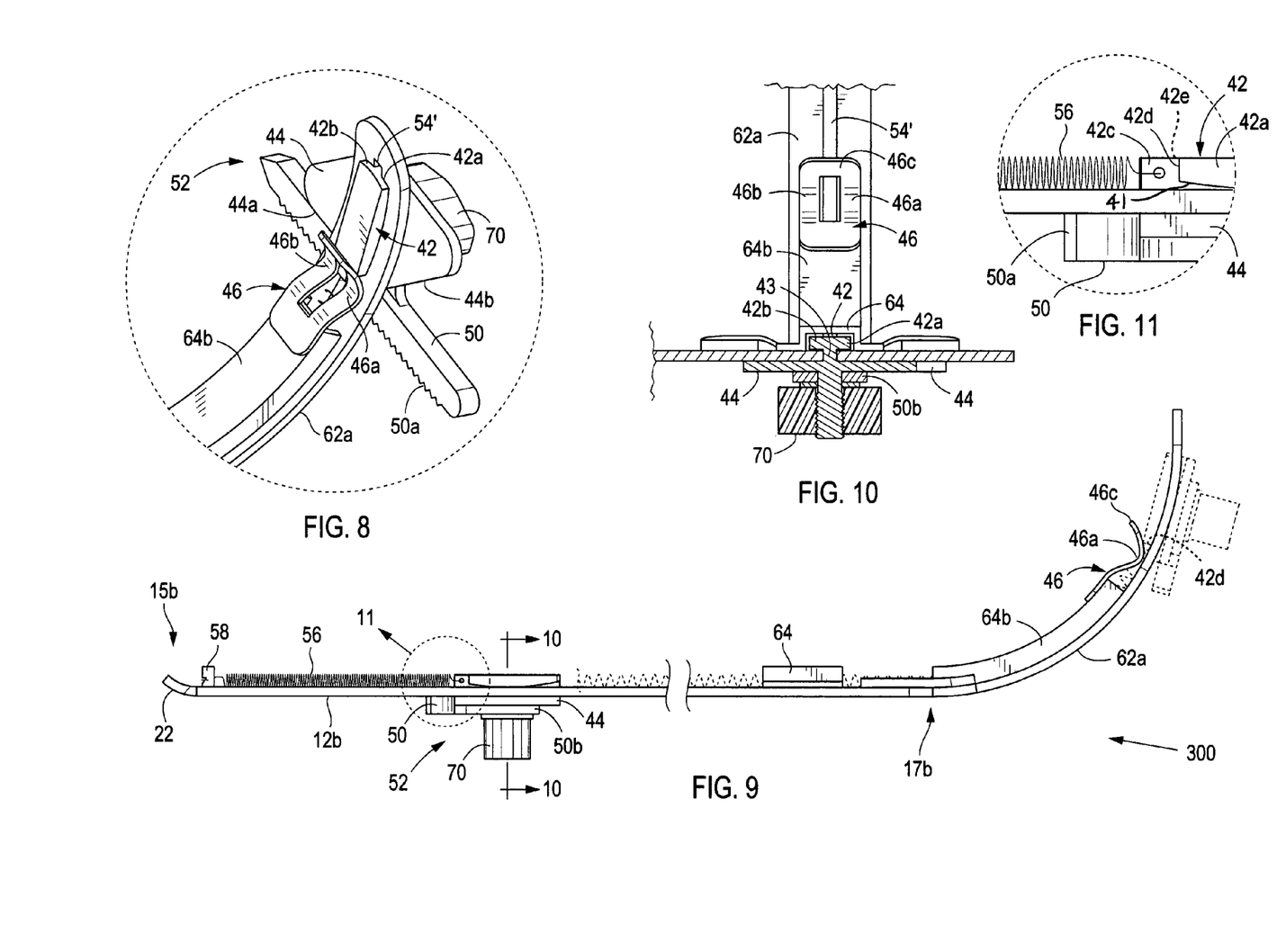
FIG. 8 is an enlarged view of the encircled area of FIG. 6.
FIG. 9 is a side view of the bottom plate of the circular saw of FIG. 6, showing the guide in solid lines in the starting position and in dashed lines in the storage position.
FIG. 10 is a partial cross-sectional view of the bottom plate and guide taken through line 10—10 of FIG. 9.
FIG. 11 is an enlarged view of the encircled area of FIG. 9.

Guide 52 comprises a slide 42 that slides within groove 54 in bottom plate 12b. A connecting portion 43, which fits within groove 54, connects cam plate 44 on the bottom with slide 42 on the top, as shown in FIG. 10. Guide 52 is attached to spring 56 at spring holding end 42c of the slide. The opposite end of the spring is attached to mounting post 58 fixed to bottom plate 12b. The spring serves to automatically reposition the slide after each cut. Although shown in FIG. 6 with groove 54 terminating close to the edge of the saw blade, the groove may preferably extend further toward the front end 15b of plate 12b to within a short distance of post 58.

Because in some situations it may not be desired to use guide 52, or for long cuts greater than the length of the bottom plate 12b, a storage unit 62 is provided at the rear end 17b of bottom plate 12b. Slide 42 slides onto slot 54' of storage unit 62, which may comprises a relatively flexible material, to the opposite side of locking spring 46, as shown in FIGS. 6 and 8. The back edge 46c of locking spring 46 holds front edge 42d and 42e of slide in place until either the user overpowers the spring force by sliding slide 42 forward or lifts the back edge 46c of the spring. Locking spring portion 46a holds edge 42d on side 42a of slide 42 and locking spring portion 46b holds edge 42e on side 42b of slide 42. The leading and trailing edges of the underside of slide 42 preferably have a gentle radius 41, shown in FIG. 11, which facilitates smooth passage from the flat plate 12b onto the arcuate rail 62a of storage unit 62.

For stability of the plate in light of the longitudinal groove 54 down the plate, there may be one or more bridges 64 attaching one side of the groove to the other through which slide 42 and spring 56 can pass. Although only a single short bridge is shown in FIG. 6, multiple such short bridges or a single longer bridge may be provided. Bridge 64b may be provided on the arcuate rail 62a to provide support for spring 46 and a smooth arcuate tunnel for kinkless movement of spring 56.

Figures 12, 13, 14:
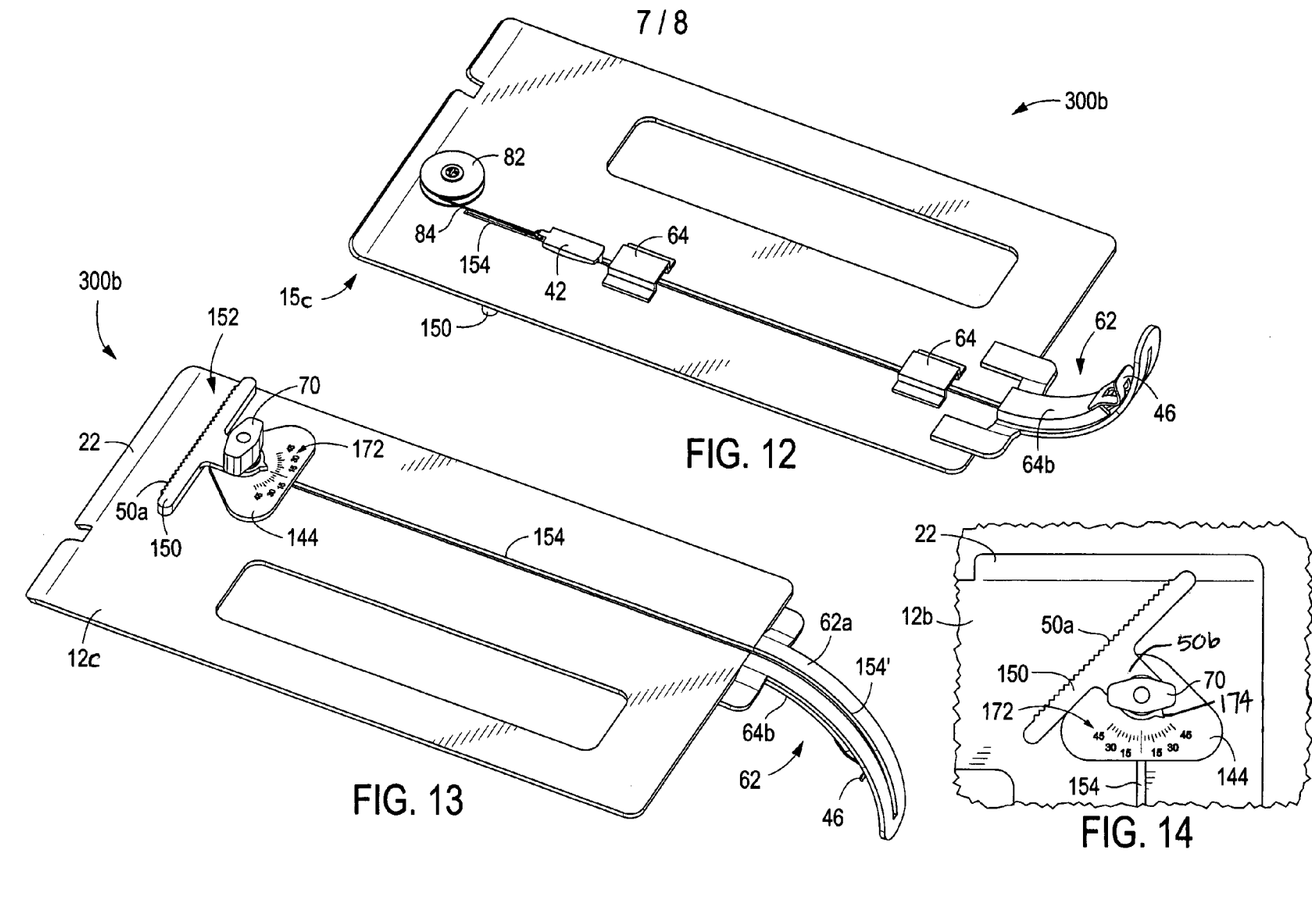
FIG. 12 is a perspective view of the top side of an exemplary bottom plate having a reel-type resistance device for the guide.
FIG. 13 is a perspective view of the bottom side of an exemplary bottom plate showing a slide with angle-indicating indicia on the slide.
FIG. 14 is a top view of the slide of FIG. 13.
Figure 15:
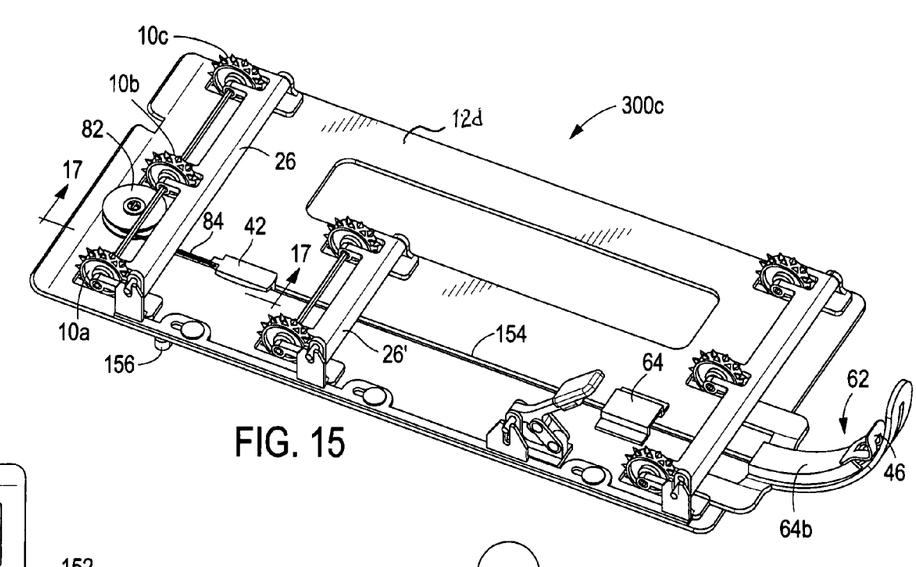
FIG. 15 is a top view of an embodiment comprising the features of the embodiments shown in FIGS. 1–3B and 12–14.
Figure 16:
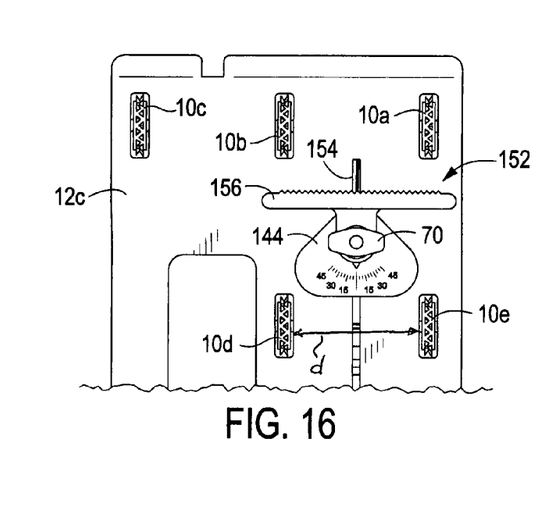
FIG. 16 is a bottom view of the embodiment shown in FIG. 15.
Figure 17:
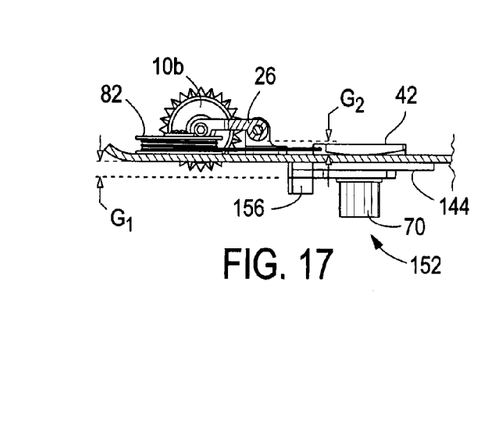
FIG. 17 is a partial cross section of the embodiment shown in FIG. 15, taken along line 17—17.
Figure 18:
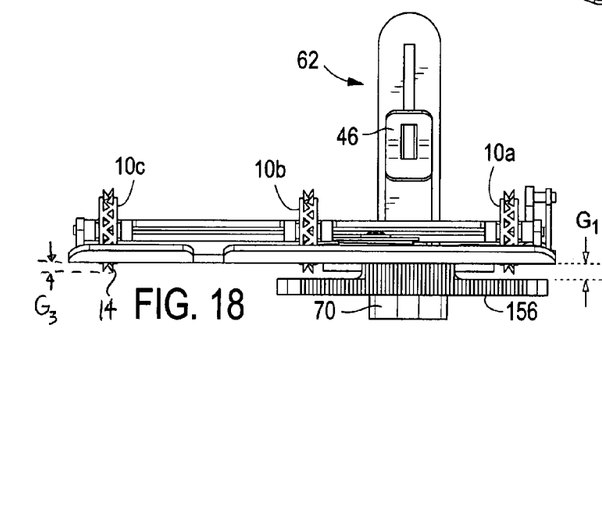
FIG. 18 is a front view of the embodiment shown in FIG. 15.

In another embodiment 300b, shown in FIGS. 12–14, slide 42 may be attached to a wire or cord 84 that is attached to a reel 82 mounted to plate 12c. Slot 154 on plate 12c extends closer to the leading edge 15b of the plate than slot 54 in embodiment 300 shown in FIG. 6, to allow alignment of the guide 150 to the edge of the workpiece closer to front 15c of the plate. Reel 82 may have a coil spring (not shown) inside that is attached to wire or cord 84 similar to the construction of a tape measure or any other self-retracting reel mechanism known in the art. Such a construction avoids the use of an elongated helical spring that may kink.

Guide 150 has a rough leading edge 50a similar to that for guide 50 shown in FIGS. 6 and 8, but does not have a pointed end. Instead, the mechanism for setting the angle of the guide comprises indicia 172 on cam plate 144 that interface with pointer 174 on tab 50b. The angled sides of cam plate 144 allow guide 150 to be positioned at an angle within a range of 45 degrees to the right or left relative to a position perpendicular to the saw blade and parallel to leading edge 15b of plate 12c. According to well known geometric principles, the angle of pointer 174 relative to the saw blade as indicated by indicia 172 is equal to the angle of guide 150 (which is perpendicular to the pointer) to a line perpendicular to the saw blade.

The guide embodiments described above allow a user to start a desired angle of cut relative to the workpiece edge by aligning the edge with guide 150 using the indicia discussed above to set the guide angle. The angle can be maintained through the entire cut by keeping the guide abutting the workpiece edge, at least through a cut that is the length of the bottom plate or shorter. When the cut is longer than the length of the bottom plate, the guide rides up onto storage unit 62 to complete the cut. The ability to set the desired angle using only the saw itself, may in some cases eliminate the need to first draw a line on the workpiece for following with the saw. Additionally, when coupled with the spiked-wheel embodiment discussed above, the guide allows a user to start a cut on a relatively long workpiece using the guide and then keep the desired angle over a length longer than the length of the bottom plate by using the wheels to keep the saw moving in the same straight line started using the guide.

Combined Embodiment

FIGS. 15–18 illustrate an embodiment that combines the features previously shown separately in FIGS. 1–3B and 12–14. Each of the identically numbered features shown in these figures is the same as and operates in the same manner as shown and described in the previous figures. To assure the spiked-wheel system and the guide system cooperate together, distance $G_2$ that guide 42 protrudes above plate 12d must be less than the distance between (not shown) between plate 12d and the bottom of arms 26 to allow proper clearance for the slide to travel underneath the arms without hitting them. Similarly, the cam plate 144 should not be wider than the distance d between the adjacent wheels (10a and 10b, 10d and 10e, 10f and 10g) between which it travels. If guide 156 is wider than d, it should have a clearance $G_1$ measured from the bottom surface of plate 12d that is greater than the distance $G_3$ that spikes 14 extend below the bottom surface, so that the guide and the spikes do not interfere with one another.

Although the transparent guide embodiment is not shown in FIGS. 15–18, it should be understood that this feature can also be combined with the features shown in that embodiment. It should further be understood that the various novel features shown herein may be used alone, in various combinations with one another, and in combinations with other features for providing any desired functionality.

Although illustrated with respect to a circular saw, the features shown herein may be used with any type of power saw known in the art.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

I claim:

1. A power saw for facilitating straight line cuts on a workpiece, the saw comprising a body, a blade, and a workpiece interface plate, the workpiece interface plate having a first face for contacting a surface of the workpiece, a second face facing the body, a front, and a rear, the workpiece interface plate comprising:
    at least two sets of wheels connected to the workpiece interface plate, each set of wheels comprising an axle having at least two wheels fixed thereto in a configuration that prevents rotation of the wheels relative to the axle, each wheel comprising a non-slip feature for minimizing slippage of the wheel on the workpiece;
    wherein the sets of wheels have a first configuration relative to the workpiece interface plate in which the wheels extend past the first face of the workpiece interface plate a sufficient distance to contact the workpiece, and a second configuration relative to the workpiece interface plate in which the wheels do not extend past the first face of the workpiece interface plate.

2. The saw of claim 1, wherein the non-slip feature comprises a plurality of protrusions capable of sticking into the workpiece.

3. The saw of claim 1, comprising three sets of wheels: a front set, a back set, and a middle set.

4. The saw of claim 3, wherein the front set and the back set each have three wheels and the middle set has two wheels.

5. The saw of claim 1, wherein the workpiece interface plate has an opening aligned with each wheel through which each wheel protrudes when in the first configuration.

6. The saw of claim 1, comprising a toggle mechanism for raising and lowering the wheels.

7. The saw of claim 6, wherein the toggle mechanism comprises a single lever for raising or lowering all of the sets of wheels simultaneously.

8. The saw of claim 7, wherein the toggle mechanism further comprises:
    each axle attached to one or more bearing arms of a wheel carriage body, each wheel carriage body pivotally attached to the workpiece interface plate;
    a motion transferring crank mounted to one end of each axle and having a pin that is slidable within a slot of a corresponding carriage bracket mounted to a synchronizing bar slidably attached to the workpiece interface plate, the motion transferring crank adapted to transfer forward or backward motion of the carriage bracket to upward or downward pivoting of the axle and associated wheel carriage body; and a toggle lever attached to a linkage adapted to move the synchronizing bar backward or forward relative to the workpiece interface plate dependent upon movement of the toggle lever, thereby simultaneously moving all of the carriage brackets attached to the synchronizing bar.

9. The saw of claim 1, wherein the saw comprises a circular saw.

10. The saw of claim 9, wherein the saw comprises a handle for picking up and directing the saw.

11. The saw of claim 1 further comprising a transparent guide attached to and extending from the front of the workpiece interface plate, the transparent guide comprising a straight line marking aligned with the saw blade for alignment with a marking on the workpiece.

12. The saw of claim 11 further comprising:

a sliding guide adapted to travel within a slot in the workpiece interface plate, the sliding guide having a first portion mounted on the first face of the workpiece interface plate and a second portion mounted on the second face of the workpiece interface plate, the first portion comprising an engagement surface for engaging an edge of the workpiece, the engagement surface adjustable to desired angle relative to the saw blade; and a resistance mechanism having a first end attached to the workpiece interface plate at or near the front of the second face of the workpiece interface plate and a second end attached to the sliding guide, the resistance mechanism adapted to provide resistance to motion of the sliding guide toward the rear of the workpiece interface plate and to retract the sliding guide back to a starting position after completion of a cut.

13. The saw of claim 12, further comprising a storage unit extending away from the rear of the workpiece interface plate, the storage unit having a slot aligned with the slot in the workpiece interface plate, the storage unit adapted to receive and store the sliding guide in a position in which the sliding guide does not engage the workpiece.

14. The saw of claim 1 further comprising:

a sliding guide adapted to travel within a slot in the workpiece interface plate, the sliding guide having a first portion mounted on the first face of the workpiece interface plate and a second portion mounted on the second face of the workpiece interface plate, the first portion comprising an engagement surface for engaging an edge of the workpiece, the engagement surface adjustable to desired angle relative to the saw blade; and a resistance mechanism having a first end attached to the workpiece interface plate at or near the front of the second face of the workpiece interface plate and a second end attached to the sliding guide, the resistance mechanism adapted to provide resistance to motion of the sliding guide toward the rear of the workpiece interface plate and to retract the sliding guide back to a starting position after completion of a cut.

15. The saw of claim 14 further comprising a storage unit extending away from the rear of the workpiece interface plate, the storage unit having a slot aligned with the slot in the workpiece interface plate, the storage unit adapted to receive and store the sliding guide in a position in which the sliding guide does not engage the workpiece.

16. The saw of claim 15, wherein the saw comprises a circular saw and:

the workpiece interface plate has an opening aligned with each wheel through which each wheel protrudes when in the first configuration; and the storage unit comprises a stop adapted to hold the sliding guide in place on the storage unit, the stop adapted to be manipulated to allow retraction of the sliding guide to the start position.

17. The saw of claim 14, further comprising a transparent guide attached to and extending from the front of the workpiece interface plate, the transparent guide comprising a straight line marking aligned with the saw blade for alignment with a marking on the workpiece.

18. The saw of claim 17, wherein the transparent guide has an upturned leading edge and is pivotably attached to the front of the workpiece interface plate to allow the guide to be pivoted into a down position to make contact with the workplace and pivoted into an up position when not being used.

19. A power saw for facilitating cuts at an angle to an edge of a workpiece, the saw comprising a body, a blade, and a workpiece interface plate, the workpiece interface plate having a first face for contacting a surface of the workpiece, a second face facing the body, a front, and a rear, the workpiece interface plate comprising:

a sliding guide adapted to travel within a slot in the workpiece interface plate, the sliding guide having a first portion mounted on the first face of the workpiece interface plate and a second portion mounted on the second face of the workpiece interface plate, the first portion comprising an engagement surface for engaging an edge of the workpiece, the engagement surface adjustable to a desired angle relative to the saw blade; and a resistance mechanism having a first end attached to the workpiece interface plate at or near the front of the second face of the workpiece interface plate and a second end attached to the sliding guide, the resistance mechanism adapted to provide resistance to motion of the sliding guide toward the rear of the workpiece interface plate and to retract the sliding guide back to a starting position after completion of a cut.

20. The saw of claim 19 further comprising a storage unit extending away from the rear of the workpiece interface plate, the storage unit having a slot aligned with the slot in the workpiece interface plate, the storage unit adapted to receive and store the sliding guide in a position in which the sliding guide does not engage the workpiece.

21. The saw of claim 20, wherein the storage unit comprises a stop adapted to hold the sliding guide in place on the storage unit, the stop adapted to be manipulated to allow retraction of the sliding guide to the starting position.

22. The saw of claim 19 further comprising indicia for setting the desired angle of the engagement surface.

23. The saw of claim 22, wherein the desired angle is in a range of 45 degrees to −45 degrees relative to a line perpendicular to the saw blade.

24. The saw of claim 19 further comprising a transparent guide attached to and extending from the front of the workpiece interface plate, the transparent guide comprising a straight line marking aligned with the saw blade for alignment with a marking on the workpiece.

* * * * *